UNITED STATES PATENT OFFICE.

JOHN HENRY HOOKER, OF BUCKINGHAM, ENGLAND.

BAKING-POWDER.

942,072.   Specification of Letters Patent.   Patented Dec. 7, 1909.

No Drawing.   Application filed May 24, 1907. Serial No. 375,422.

*To all whom it may concern:*

Be it known that I, JOHN HENRY HOOKER, of The Firs, 26 Chandos road, Buckingham, England, director of a public company, have invented certain new and useful Improvements in and Relating to Baking-Powder, of which the following is a specification.

This invention has for its object to provide a process for the manufacture of a highly nutritive baking powder having milk as a basis, which process will be applicable to baking powders of all kinds and will allow milk to be used in large proportions in place of the farinaceous filling materials usually employed, while by means of a modification effected in the nature of the milk this latter, reduced to the dry form, is alkaline in character and readily soluble, and the evolution of the carbonic acid in the dough is regulated in such a way that the bubbles are intimately and uniformly broken up and entangled in the dough, so that a much lighter and better crumb is obtained.

It has been proposed to add a small proportion (about 4 per cent.) of previously dried and powdered milk to the other ingredients of a cream of tartar baking powder, but such a milk powder is not soluble or alkaline and can only be added in small proportions.

According to this invention, instead of employing inert farinaceous substances as diluents, I incorporate with the ingredients evolving carbonic acid an equivalent proportion of milk in a dried soluble and alkaline powdered form. This soluble alkaline milk powder is obtained by incorporating all or some of the bicarbonate of soda or other alkaline carbonate with milk, and afterward evaporating to dryness at a temperature below boiling heat and reducing to powder. I have found that by the substitution of this milk powder for flour, the evolution of carbonic acid gas is controlled in a most surprising manner, and the bubbles of gas are broken up and entangled in the dough in a very uniform and complete fashion, so that a much lighter and better crumb is obtained.

In order to secure the advantages of the invention to the full, it is of great importance to add the alkaline carbonate to the milk when this has been partly concentrated and is in a semi-liquid condition.

The invention is equally applicable to all baking powders whatever be the acid substances employed, but I will illustrate the invention with reference to the best known form of baking powder with tataric acid.

In a typical baking powder containing in 100 parts 20 parts of tartaric acid, 25 parts bicarbonate of soda, and 55 parts rice starch, I replace a part or the whole of the starch by the milk powder. The best results are obtained when the whole of the starch is replaced by the milk powder. Thus the improved powder would have the composition tartaric acid 20 parts, bicarbonate of soda 25 parts, milk powder 55 parts. I do not mix all the ingredients together by sieving in a dry state as usually followed, but I incorporate the bicarbonate of soda or a portion thereof with the milk before it is completely reduced to dryness, and if any starch is employed it is also added to the milk in the same condition. In practice it suffices to add about three per cent. of the bicarbonate to the semi-liquid milk. The following is an example of my process of making the baking powder.

I preferably remove the fats from the milk by a centrifugal machine. The removal of the fats is not essential, but it enables the milk to be more easily dried. The milk is then concentrated at about 50 degrees to 60 degrees C. preferably *in vacuo*, to say one-fourth or one-fifth of its original volume. The bicarbonate of soda (say about three per cent. of the total quantity used for the baking powder) or other alkaline carbonate is then thoroughly stirred into the milk, which is afterward evaporated to dryness at about 50 degrees to 60 degrees C. *in vacuo* or other well known manner. It is then ground into a fine powder and sifted, to insure its being in a minute state of subdivision, in which form it is incorporated with the other ingredients of the baking powder. By the incorporation of the bicarbonate of soda with the milk while still liquid, the milk powder obtained is readily soluble, so that its restraining and entangling influence at once comes into play. Further, as the result of treating the milk as described it is impossible for the acid substance to react with the bicarbonate and evolve gas until the milk powder is also dissolved.

The improved baking powder made in accordance with this invention has many advantages over the baking powders commonly in use. A considerably greater leavening effect is obtained with the same amount of available carbonic acid when evolved from my baking powder. Much smaller quantities of tartaric acid and bicarbonate of soda for instance are required to produce the same leavening effect when incorporated with the soluble milk powder as compared with the baking powder containing starch as filling material. Consequently a much smaller quantity of tartrates is contained in the bread or pastry, which is moreover more uniform and lighter in texture and whiter in appearance. The residual milk powder also gives the bread or pastry made with my improved baking powder an increased nutrient value, as the proportion of proteids is largely increased by the casein of the milk.

What I claim and desire to secure by Letters Patent is:—

1. As a new article of manufacture, baking powder comprising as an ingredient a soluble alkaline milk powder containing not less than two per cent. of alkali.

2. As a new article of manufacture, baking powder comprising as an ingredient a soluble alkaline milk powder containing not less than two per cent. of alkali, an alkaline carbonate, and a solid acid substance, substantially as described.

3. As a new article of manufacture, baking powder consisting of a soluble alkaline milk powder containing not less than two per cent. of alkali, bicarbonate of soda and tartaric acid, substantially as described.

4. A process for the manufacture of baking powder, comprising partial concentration of milk, addition to the partially concentrated milk of an alkali carbonate, evaporation of the mixture to dryness at a temperature below boiling heat, pulverization of the dry mixture and incorporation of the same with further alkali carbonate and with a solid acid substance capable of reacting therewith under the action of heat and moisture to evolve carbonic acid.

5. A process for the manufacture of baking powder, comprising partial concentration of milk, addition to the partially concentrated milk of bicarbonate of soda, evaporation of the mixture to dryness at a temperature below boiling heat, pulverization of the dry mixture and incorporation thereof with further bicarbonate of soda and a solid acid substance, as tartaric acid, capable of reacting therewith under the action of heat and moisture, to evolve carbonic acid.

6. A process for the manufacture of baking powder, comprising partial concentration of milk, addition to the partially concentrated milk of an alkali carbonate, evaporation of the mixture to dryness at a temperature below boiling heat, pulverization of the dry mixture and incorporation of the same with further alkali carbonate and a solid acid substance capable of reacting therewith under the action of heat and moisture to evolve carbonic acid, the alkali carbonate added to the partially concentrated milk being about 2 to 3 per cent. of the total quantity employed in the manufacture of the baking powder.

In witness whereof, I have hereunto signed my name in the presence of two subscribing witnesses.

JOHN HENRY HOOKER.

Witnesses:
ROBERT MILTON SPEARPOINT,
H. D. JAMESON.